United States Patent [19]
Staas

[11] Patent Number: 6,047,499
[45] Date of Patent: Apr. 11, 2000

[54] PLANT SAUCER WITH OVERFLOW RELIEF VALVE

[76] Inventor: Harry John Staas, 6801 Langley Springs Ct., McLean, Va. 22101

[21] Appl. No.: 08/963,806

[22] Filed: Nov. 4, 1997

[51] Int. Cl.[7] .................................................. A01G 9/02
[52] U.S. Cl. .................................................. 47/71; 47/65.6
[58] Field of Search .................................. 47/51, 65.6, 71

[56] References Cited

U.S. PATENT DOCUMENTS

| | | | |
|---|---|---|---|
| 603,492 | 5/1898 | Waterer | 47/71 |
| 2,983,076 | 5/1961 | Merrill | 47/71 |
| 4,077,159 | 3/1978 | Haglund | 47/71 |
| 5,042,197 | 8/1991 | Pope | 47/71 |
| 5,113,618 | 5/1992 | Rigsby | 47/65.5 |

FOREIGN PATENT DOCUMENTS

| | | | |
|---|---|---|---|
| 2596610 | 10/1987 | France | 47/71 |
| 614099 | 11/1979 | Germany | 47/71 |
| 6280 | 11/1894 | Sweden | 47/71 |

*Primary Examiner*—Peter M. Poon
*Assistant Examiner*—Elizabeth Shaw
*Attorney, Agent, or Firm*—Staas & Halsey LLP

[57] ABSTRACT

A saucer for a potted plant comprises a bottom wall and a sidewall joined at its lower edge to the periphery of the bottom wall and sealed thereto and defining therewith a reservoir for receiving water for a potted plant supported on the bottom wall of the saucer. A passageway, which may include a nipple, extends through a sidewall of the saucer and joins a first end of a tube; a second, free end of the tube is moveable between an upper position preventing discharge of water from the reservoir therethrough to a lower position permitting controlled discharge of water from the reservoir therethrough.

19 Claims, 4 Drawing Sheets

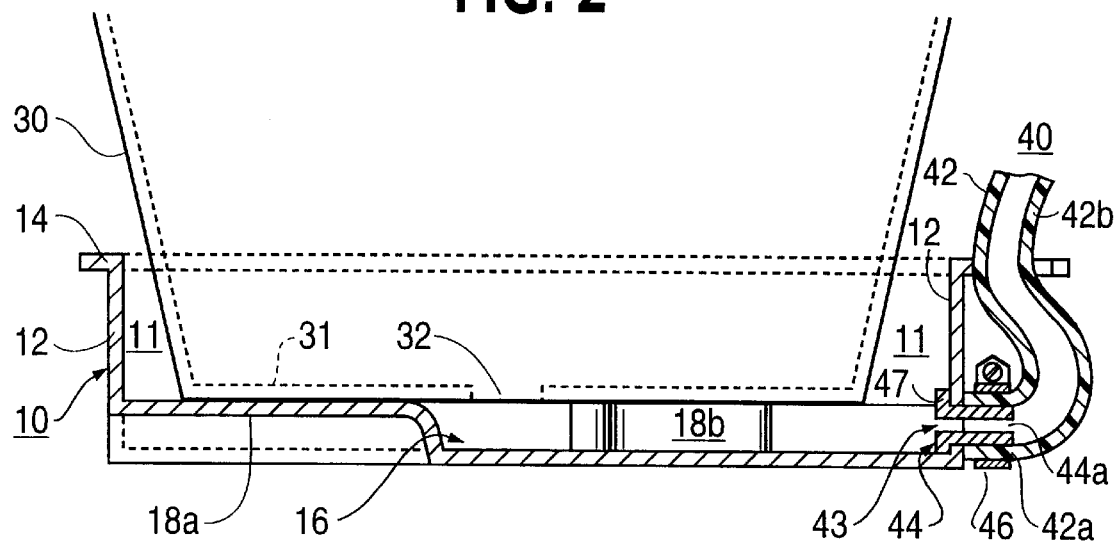
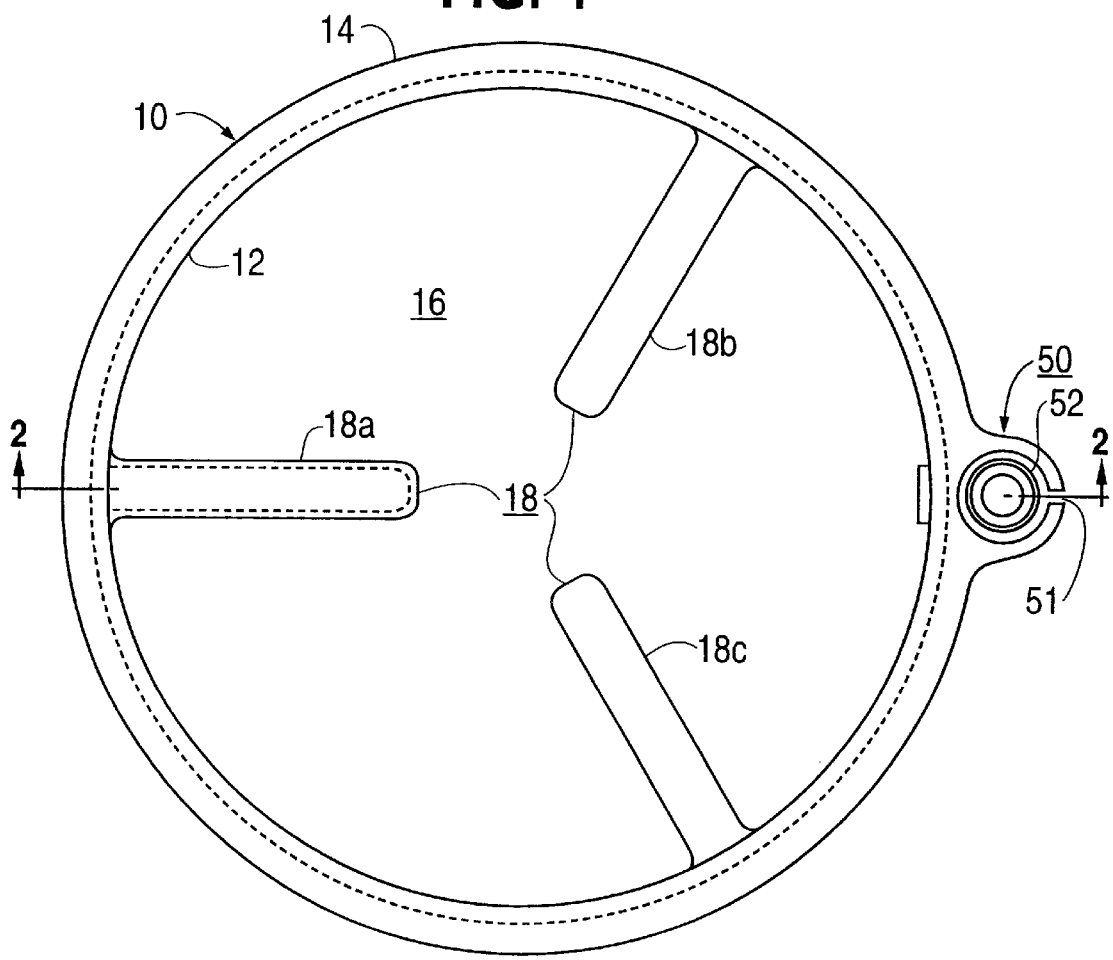

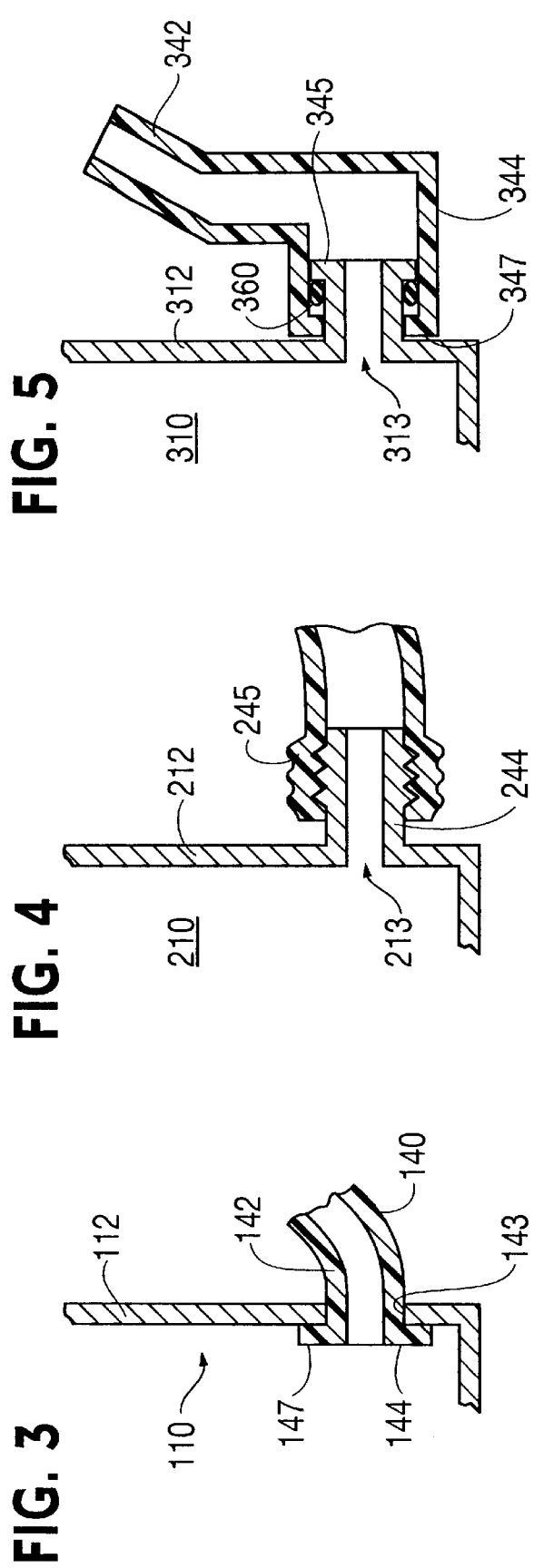

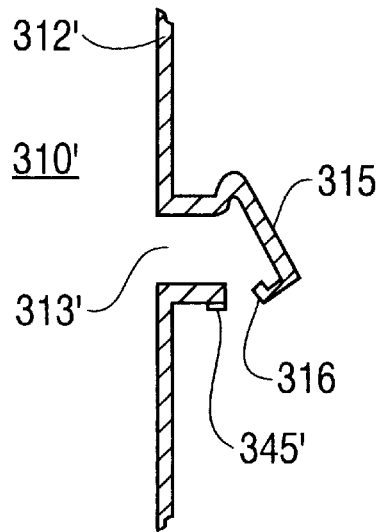
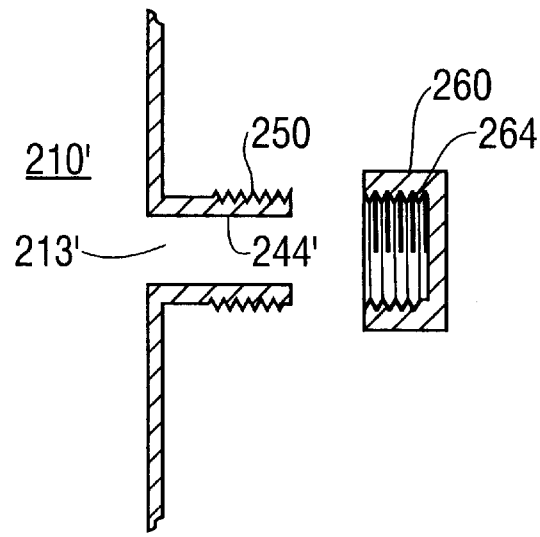
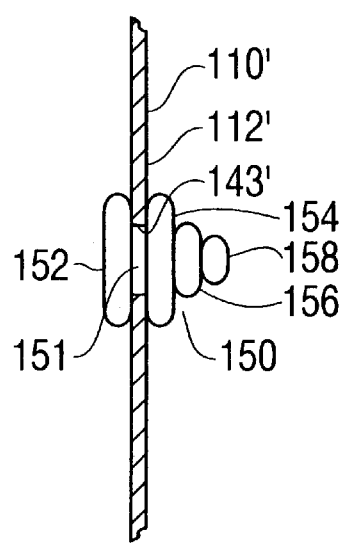
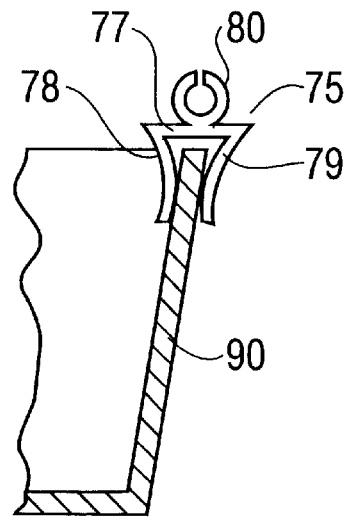

PLANT SAUCER WITH OVERFLOW RELIEF VALVE

BACKGROUND OF THE INVENTION

1. Field of the Invention

This invention relates to a water-retaining saucer, or tray, for a plant and, more particularly, to such a plant saucer, or tray, having an overflow relief valve.

2. State of the Prior Art

Plant saucers, or trays, are well known in the art and are used, typically for a potted plant, to retain excess water which either overflows from a pot in which the plant is potted or escapes from the pot through a drain hole as is typically provided in the bottom of the pot. A plant saucer thus protects surrounding surfaces from water damage while also serving as a reservoir, the water retained therein being absorbed into the soil within the pot by return flow through the drain hole.

Such saucers are of various different configurations and are made of various different materials, including relatively lightweight molded plastic saucers, earthenware saucers and metallic saucers, for example.

The plastic and metallic type saucers in many respects provide better protection than an earthenware for an underlying surface on which the saucer with the potted plant is placed, due to the impermeability of the plastic or metallic material of which they are formed. On the other hand, plastic saucers typically are very light weight and flexible. As a result, as the height of water approaches the rim of the saucer and an overflow condition, it becomes difficult to take corrective measures, such as moving the saucer to a safe location for discharge of the excess water, etc., since the plastic saucer likely will deform and water spillage then will occur. The resulting potential water damage to the surroundings is a problem which the saucer was intended to avoid at the outset. The earthenware and metallic saucers, on the other hand, are more rigid; nevertheless, even if the potted plant can be removed from the saucer and/or moved with the saucer to a safe location for discharge of the excessive water, before overflow occurs, there remains the problem of spillage occurring in such movement from the overly full saucer, especially due to the large exposed surface area of the water in a typical saucer configuration.

Certain plants, such as orchids, preferably are watered by continuous flushing with a large volume of water, well exceeding the capacity of the pot and any saucer in which it is kept. In such instances, the pots and associated saucers must be removed from their normal surroundings and transported to a remote location for watering and then left to drain, before being returned to their normal surroundings.

Existing plant saucers thus have significant limitations and inadequacies in their use and capabilities, rendering them not only inconvenient in use but also incapable, in many respects, of performing their intended functions.

SUMMARY OF THE INVENTION

Accordingly, it is an object of the present invention to provide a plant saucer which overcomes these and other problems of prior such structures and, more particularly, to provide a potted plant saucer having an overflow relief valve which permits draining off excess water which accumulates in the saucer during watering of the plant, and which thus eliminates the need presented by prior art saucers of transporting the potted plant and/or the saucer to a suitable water discharge location (e.g., a sink) to empty same or otherwise to prevent random water spillage and the resulting, potential water damage to the surroundings of the plant and saucer.

It is another object of the present invention to provide an overflow relief valve for use with a plant saucer which is readily, manually adjustable between a secure, non-discharge ("OFF") position and a conveniently oriented discharge ("ON") position for draining off excessive water.

Yet another object of the present invention is to provide a plant saucer having an overflow relief valve which is simple and inexpensive in construction and which may be implemented in saucers made of any suitable material, e.g., plastic, metal, and earthenware materials, and of an appropriate configuration.

These and other objects of the invention will become apparent from the following drawings and detailed descriptions of the invention and various embodiments in which it may be implemented.

BRIEF DESCRIPTION OF THE DRAWINGS

FIG. 1 is a top, planar view of a potted plant saucer having an overflow relief valve in accordance with a first embodiment of the invention;

FIG. 2 is a cross sectional view, taken along the line 2—2 in FIG. 1, illustrating details of the structure of the plant saucer and overflow relief valve of the first embodiment of the invention and illustrating in phantom lines a plant pot, as received in the saucer in normal use;

FIG. 3 is a vertical cross-sectional and fragmentary view illustrating a second embodiment of a plant saucer having an overflow relief valve in accordance with the invention;

FIG. 4 is a vertical cross sectional and fragmentary view illustrating a third embodiment of a plant saucer having an overflow relief valve in accordance with the invention;

FIG. 5 is a vertical cross sectional and fragmentary view illustrating a fourth embodiment of a plant saucer having an overflow relief valve in accordance with the invention;

FIGS. 8A, 8B and 8C represent alternative relief valve structures; and

FIG. 9 illustrates an alternative embodiment of the clamp for a free end of a drainage tube of a saucer.

DETAILED DESCRIPTION OF THE DRAWINGS

Figure 7A:
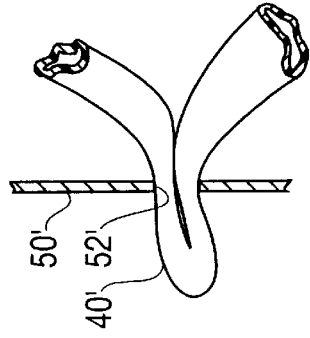
FIGS. 7A and 7B illustrate a shut-off connection for each relief valve in the system embodiment of FIG. 6 and which shut-off connection serves to prevent inadvertent gravity flow filling of a lower saucer from a higher saucer during controlled discharge operations and which could otherwise produce overflow conditions.

With concurrent reference to FIGS. 1 and 2, a potted plant saucer 10 of molded plastic has a conventional configuration of a generally cylindrical sidewall 12 having a radially outward, transverse flange 14 integral with an upper edge of the cylindrical sidewall 12 and a circular bottom 16 integral about its peripheral edge with a bottom edge of the cylindrical sidewall 12. The bottom 16 includes a plurality of radially extending reinforcement ribs 18, shown arbitrarily to be three in number and identified individually as the ribs 18a, 18b and 18c; the ribs 18 support the bottom of a pot or container 30 (shown in phantom lines in FIG. 2), the bottom 31 thereof having a central drainage opening 32 therein. The ribs 18 thus elevate the bottom 31 of the container 30 above the main surface of the circular bottom 16 of the saucer 10 to permit water and other fluids within the pot 30 to drain through the opening 32 into the region 11, between the exterior of the pot 30 and the interior of the sidewall 12. The region 11 thus will be understood to function as a reservoir, not only capturing excess water which drains from the pot to prevent water damage to the surroundings but also retaining the excessive water so that it can be reabsorbed into the soil within the pot 30, as required.

The overflow relief valve 40 in the embodiment of FIGS. 1 and 2 comprises a flexible hose, or tube, 42 which is engaged at its lower end 42a over a protruding portion of a nipple 44 received through an opening 43 in the cylindrical sidewall 12. If desired, a hose clamp 46 may be clamped onto the exterior protruding end 44a of the nipple 44 to secure the hose end 42a thereon. The nipple 44 may have a radial flange 47 at the interior end thereof which is engaged against an interior surface of the sidewall 12 and, for that purpose, may have an O-ring disposed between the flange 47 and the interior surface of the cylindrical sidewall 12 to assure a water-tight seal.

As an alternative, the flange 47 may be bonded, e.g., by an epoxy resin, to the interior surface of the cylindrical sidewall 12 surrounding the opening 43. As another alternative, the nipple 44 may be molded integrally with the sidewall 12 of the saucer 10; moreover, the tube 42 likewise may be molded integrally with the nipple 44, thereby further simplifying the overall construction.

To prevent inadvertent drainage through the overflow relief valve 40, the upper end 42b thereof is raised vertically and a portion of the tube 42 adjacent the upper end 42b is bent over on itself, or crimped, and then resiliently urged into a clamp 50, through a restricted path or passageway 51 and retained in the interior, engaging aperture 52.

To discharge water retained within the saucer 10, the tube 42 is released from the clamp 50 and disposed downwardly into a bucket or other receiving container.

The embodiment of FIGS. 1 and 2 has been shown with the nipple 44 disposed essentially at the level of the interior surface of the bottom wall 16, permitting draining substantially all of the water from within the saucer 10 should that be desired. If it is desired to retain a level of water within the reservoir 11, the tube 42 simply is returned to its upward, cut-off position when the desired level of water in the reservoir 11 is reached. Since it is normally desired that a level of water be retained in the reservoir 11 and, as a further alternative, the nipple 44 may be located, instead, at a vertically higher position in the cylindrical sidewall 12, essentially at the level corresponding to the desired height of water within the reservoir 11. The highest such position, of course, must be selected such that it remains effective for draining sufficient water from the reservoir 11 to prevent spillage of water over the top edge of the wall 12 and flange 14. The higher position of the nipple, moreover, facilitates gravity drainage of the water from within the saucer 10 to a receiving bucket, for those circumstances in which the saucer 10 is placed directly on a floor. On the other hand, plants typically are maintained on a plant stand, providing sufficient elevational positioning of the bottom 16 of the saucer 10 relatively to an underlying support floor on which the receiving bucket would be located, to assure acceptable drainage by gravity flow.

FIG. 3 illustrates a second embodiment of the invention in which saucer 110 has an overflow relief valve 140 mounted in a cylindrical sidewall 112. The nipple 144 is an integral part of a flexible tube, 142, the tube 142 being received through an opening 143 in the sidewall 112 and the flange 147 abutted against and bonded to the sidewall 12 so as to form a seal therewith. The embodiment of FIG. 3 may otherwise correspond to that of FIGS. 1 and 2.

FIG. 4 illustrates a third embodiment of the invention which is particularly suitable for implementation in earthenware or metal materials, in which the saucer 210 has a cylindrical wall 212 from which protrudes an integral nipple 244 having radial ribs 245 over which an end of a pliable tube 240 is resiliently urged and received, and thereby is resiliently engaged, and retained, on the annular ribs 245 against removal therefrom; this arrangement, as well, assures a water-tight seal of the tube 242 to the nipple 244.

FIG. 5 illustrates a fourth embodiment of the invention in which the saucer 310, having a sidewall 312 with an opening 313 therein, is made of metal or of a rigid plastic (or other suitable synthetic) material and includes a nipple 444 having a radially outward annular flange 445 on the free end thereof, forming a seat for an O-ring 360. The lower end 344 of a tube 342 has a radially inward annular flange 347 which is snap fit over the flange 345 and the O-ring 360, resiliently engaging the O-ring 360 against the flange 345 and/or the nipple sidewall to provide a water-tight seal. In this embodiment, the tube 342 is rigid and rotated from an upward, OFF position to a downward, discharge (ON) position.

Figure 6:
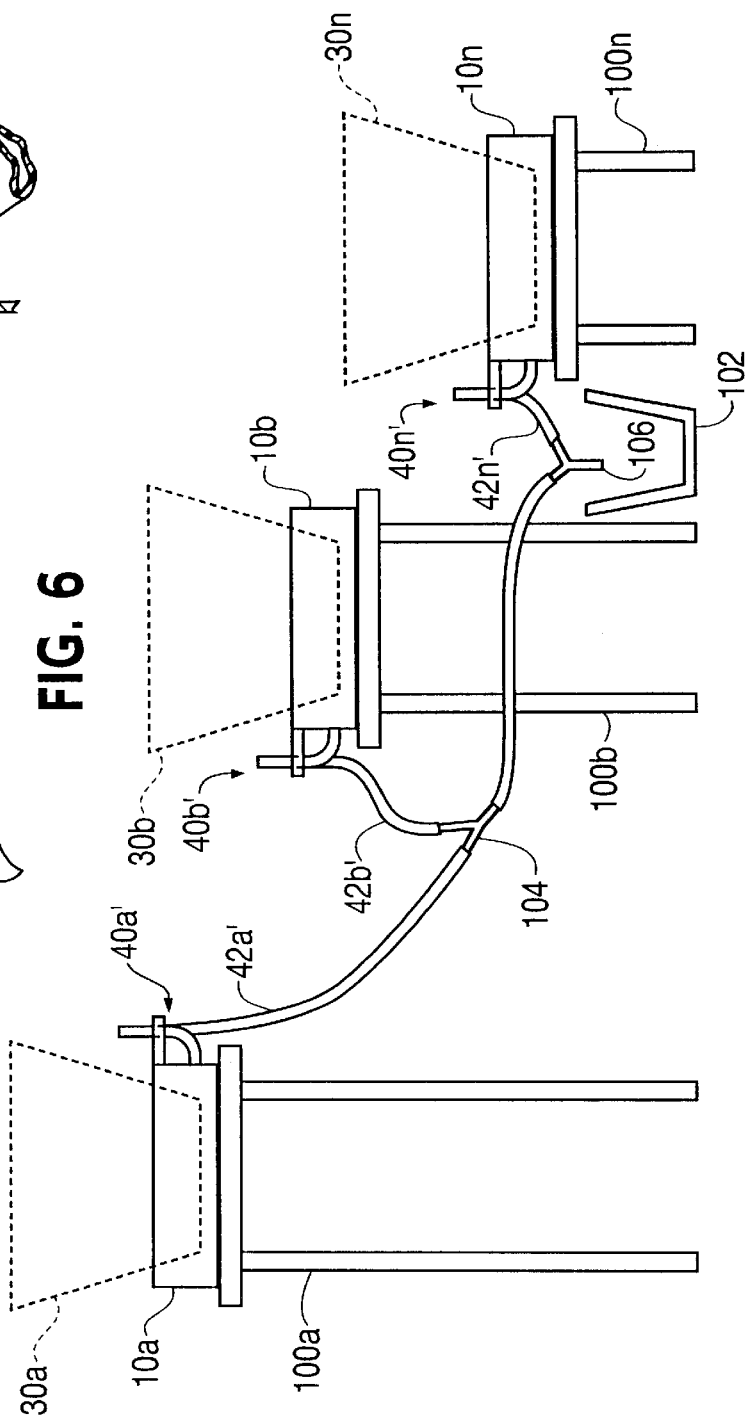
FIG. 6 is a schematic illustration of a system incorporating multiple plant saucers having overflow relief valves and integrated drains in accordance with a further embodiment of the invention.

As shown in FIG. 6, any of the foregoing embodiments of the invention furthermore is adaptable to a system implementation, in which plural plant stands 100a, 100b . . . 100n support respective saucers 10a, 10b, . . . 10n having disposed therein corresponding pots 30a, 30b . . . and 30n and which are interconnected through discharge tubes for discharge of excess water into a bucket 102. If the bucket is of sufficient capacity and/or, instead, constitutes a drain, the discharge tubes need not be valved, but may remain open at all times. Preferably, however, relief valves 40a', 40b', . . . 40n', which may have the same basic construction as the relief valve 40 in FIGS. 1 and 2, connect the saucers 10a, 10b, . . . 10n to the respective discharge tubes 42a', 42b', . . . 42n'; the latter then are interconnected by Y couplings 104 and 106 to provide a common discharge path, from the final Y coupling 106, into the bucket 102.

Figure 7B:
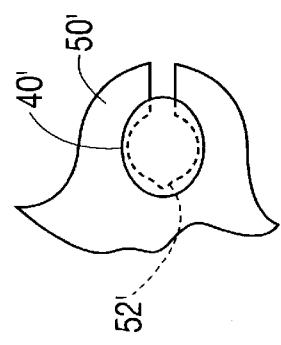

The relief valves alternatively may have the configuration shown in a top planar view in FIG. 7A and a side elevational view in FIG. 7B and in which the tube 40' is effectively bent in half and crimped within the receiving aperture 52' of the clamp 50', such as is done with a garden hose, to stop the flow of water therethrough. In FIG. 6, the crimping prevents water from a higher saucer from back-flowing and discharging into a lower saucer, which could cause same to overflow. As shown in FIG. 6, the Y drain 104 is below the level of the bottom of the intermediate pot 30b; nevertheless, gravity fill from saucer 10a into saucer 10b could still occur, as well as into the lowermost saucer 10n. The crimping thus is a safeguard against such unintentional overflow occurring during draining operations. The arrangement of FIG. 6 is particularly suitable when it is desired to irrigate one or more of the potted plants by applying sufficient water thereto for flushing same, since permitting the necessary drainage to occur while avoiding overflows and spillage from others of the interconnected lower elevational saucers.

As an alternative to the system implementations using crimping as in FIGS. 6–7B, an in-line ON/OFF valve may be included in the path of each drainage tube which would prevent a reverse flow of water from a saucer at a higher elevation into a saucer at a lower elevation.

FIGS. 8A, 8B and 8C represent alternative relief valve structures, each of which is suitable for use in any of the foregoing embodiments.

In FIG. 8A, the nipple 310' is integral with a sidewall 312', as in the embodiment of FIG. 5, but in FIG. 8A, the passageway 313' through the nipple 310' is sealed by a flexibly hinged cap 315 having an annular, inward lip 316 which engages an outwardly annular lip 345' in water tight, sealing relationship. Alternatively, the cap 315, rather than being an integral extension of the nipple, may instead be a snap-on cap having an annular snap rim 316 extending continuously thereabout and received over a continuous outward annular sealing lip 345'.

FIG. 8B illustrates a further alternative embodiment of a nipple 210', similar in appearance to the nipple 210 of FIG. 4 but having male screw threads 250 on the outer wall 244' and employed with a cap 260 having female threads 264 on the interior thereof which are received on the male threads 250 in mechanically secure and water tight relationship.

FIG. 8C illustrates yet a further alternative embodiment of a valve arrangement of a saucer 110' having a wall 112' with an aperture 143' therein and which receives a valve 150 in a water tight, sealed relationship in a groove 151 between two contiguous annular sealing ring 152 and 154; exterior of the sidewall 112' are additional, but progressively smaller annular rings 156 and 158. The valve 150 is similar to those used in inflatable devices, such as rafts and the like, which may be grasped and extended axially, opening a valved passageway therein and, alternatively, compressed and shortened axially to the position shown, sealing the valved passageway therein.

In each of FIGS. 8A, 8B and 8C, the nipples are of a sufficient axial length and disposed at a sufficient distance from the bottom wall of the respective saucer to enable collecting the drainage therethrough in a bucket, for disposal.

FIG. 9 illustrates an alternative embodiment of a clamp 75 having are resilient central arm 77 and a pair of depending legs 78 and 79 which are biased into engagement in a rest condition; in use, they are resiliently forced apart so as to be received over and clamp therebetween the edge of the side wall 90. Further, the clamp 75 has a ring-like structure 80 on the upper surface into which a free end of a drainage tube for a saucer is inserted and retained, either in the open configuration as in FIG. 2 or in the crimped condition as in FIGS. 7A and 7B. The sidewall 90 in FIG. 9 may represent the sidewall of a saucer or, alternatively, the sidewall of a pot and, indeed, the clamp 75 may be moved therebetween. It further will be understood that the retaining element 80 may be positioned on the side of the leg 79 in either a horizontal orientation so as to hold a free end of a tube as seen in FIG. 2 or in the orientation shown in FIG. 9, as may be desired. As will also be apparent from FIG. 9, a slot may be provided in a top edge of the wall 90 in which a drainage tube is inserted and held, whether in a rigid plastic or metal saucer or pot or an earthenware saucer or pot.

As will be apparent, features of one embodiment may be used in one or more of the other embodiments. For example, the hose clamp of FIG. 2 may readily be used in FIG. 4. Further, the height position of the relief valve relative to the height of the cylindrical sidewall of the saucer may be selected for the necessary functional requirements, as discussed above, in each of these embodiments. In addition, whereas a plastic saucer material is implied in many of the above descriptions, alternative materials such as metal may be employed for the saucer and nozzle and, if not integral, the nozzle may be soldered to the sidewall, as an alternative to use of a resin to join a plastic nozzle to a plastic sidewall. Thus, any suitable material is intended to be encompassed. Further, the saucer is not limited to the cylindrical configuration shown in the drawings.

The above and numerous other modifications and adaptations of the invention will be apparent to those of skill in the art and thus it is intended by the appended claims to cover all such modifications and adaptations as fall within the true spirit and scope of the invention.

What is claimed is:

1. A saucer for a plant potted in a plant container, comprising:

a bottom wall;

a sidewall having a lower edge joined to the periphery of the bottom wall and defining therewith an interior of the saucer affording a reservoir for receiving water to a desired maximum level; and a passageway extending from the reservoir and through the sidewall to an exterior of the sidewall and including a tube extending from the exterior of the sidewall to a free end of the tube, the tube being moveable to position the free end thereof selectively at an up position, preventing discharge of water from the reservoir by flowing therethrough, and a down position, permitting discharge of water from the reservoir by flowing therethrough.

2. A saucer as recited in claim 1, further comprising:

a clamp, secured to the saucer, releasably engaging the tube and thereby maintaining the free end of the tube in the up position thereof.

3. A saucer as recited in claim 2, wherein the tube is crimped in the portion of the tube inserted into the clamp to prevent the flow of water therethrough.

4. A saucer as recited in claim 2, wherein the tube is crimped and engaged within the clamp, thereby preventing any flow of water therethrough.

5. A saucer as recited in claim 2, wherein the free end of the tube is held at an elevation above the upper edge of the sidewall, thereby preventing gravity discharge of water, filled to the desired maximum level in the reservoir, from discharging therethrough from the reservoir.

6. A saucer as recited in claim 1, further comprising:

a flange extending outwardly from the upper edge of the sidewall and reinforcing the sidewall.

7. A saucer as recited claim 6, the clamp further comprising a radial extension of the flange having an aperture therein and a passageway extending from the aperture and to a periphery of the flange and through which the tube is forced and releasably, resiliently retained therein.

8. A saucer as recited in claim 1, further comprising:

a nipple extending through an aperture in the sidewall and joined and sealed to the sidewall, the tube extending from the nipple at the exterior of the sidewall.

9. A saucer as recited in claim 8, wherein the nipple is an integral part of the sidewall.

10. A saucer as recited in claim 9, wherein the tube is an integral extension of the nipple.

11. A saucer as recited in claim 8, wherein the tube is rotatably mounted on the nipple with a water tight seal therebetween, affording rotational movement of the tube between the up and down positions of the free end thereof.

12. A saucer as recited claim 8, wherein the nipple has outwardly extending ribs thereon and the tube is slidingly received over and resiliently, releasably engaged on the ribs so as to form a resilient mechanical connection and a water tight seal therebetween.

13. A saucer for a plant potted in a plant container, comprising:

a bottom wall;

a sidewall joined to the bottom wall and having a first height defining an interior of the saucer affording a reservoir for receiving and retaining water therein; and an overflow relief valve supported on the sidewall of the saucer and defining a passageway through the sidewall at a second height, less than the first height, the overflow relief valve being selectively movable between a first position effectively closing the passageway and permitting water to accumulate within the reservoir to a level above the second height of the passageway and to a second position effectively opening the passageway to enable discharge of water within the reservoir at a level in excess of the second height of the passageway and to prevent an accumulation of water to a level exceeding the first height of, and which would overflow, the sidewall.

14. A saucer as recited in claim 13, wherein the overflow relief valve comprises a flexible tube sealed at a first end to the sidewall and having a free end; and a tube engaging element engaging the tube so as to maintain the free end of the tube above the first height of the sidewall in the second position.

15. A saucer as recited in claim 14, further comprising:

a nipple formed integrally with the saucer sidewall and extending therethrough; and the first end of the tube is received on the end of the nipple at the exterior of the sidewall in a water tight connection therewith.

16. A saucer as recited in claim 14, further comprising:

a nipple which extends through an aperture in the sidewall to the exterior of the sidewall and is sealed to the sidewall forming a water tight connection therewith; and the first end of the tube is received on the end of the nipple at the exterior of the sidewall in a water tight connection therewith.

17. A saucer as recited in claim 13, further comprising:

a nipple extending from the sidewall and defining a first portion of the passageway from the reservoir; and the tube comprises a rigid tube rotatable mounted on the nipple with a water tight seal and defining a second portion of the passageway, the rigid tube being rotatable about the nipple so as to position the free end thereof selectively at the up position or at the down position.

18. An irrigation system for plural plants, each plant potted in its own container, comprising:

plural respective saucers for the plural plants, each saucer comprising:

a bottom wall, a sidewall joined to the bottom wall and having a height defining an interior of the saucer affording a reservoir for receiving and retaining water therein, and a passageway selectively controlling the discharge of water from the reservoir to an exterior of the saucer so as to limit an accumulation of water within the reservoir to a desired level below the height of the sidewall and prevent an accumulation of water to a depth which would overflow the sidewall; and coupling elements coupling the respective passageways of the saucers for collective discharge of the water being selectively discharged by gravity from the individual saucers.

19. An irrigation system as recited in claim 18, further comprising:

a respective clamp, secured to each saucer, releasably engaging the respective tube and thereby maintaining the free end of the tube, in the up position thereof; and the tube is crimped and engaged within the clamp, thereby preventing any flow of water therethrough.

* * * * *